FEODOR KANGER
JACQUES A. DESBAILLETS
INVENTOR

FEODOR KANGER
JACQUES A. DESBAILLETS
INVENTOR

PATENT AGENT

United States Patent Office 3,489,391
Patented Jan. 13, 1970

3,489,391
HYDRAULIC RING GATE FORCE BALANCING
Feodor Kanger, Cote St. Luc, Quebec, and Jacques Arthur Desbaillets, Montreal, Quebec, Canada, assignors to Dominion Engineering Works, Limited, Lachine, Quebec, Canada, a Canadian corporation
Filed Feb. 2, 1967, Ser. No. 613,461
Int. Cl. F01d 17/08; F16k 39/00
U.S. Cl. 415—157                                            7 Claims

ABSTRACT OF THE DISCLOSURE

An annular ring gate for shutting off the radial flow of working liquid therethrough is provided with a by-pass flow path for the working liquid extending across the main surfaces of the gate and the adjacent surfaces of the gate housing, to provide controlled differential pressure drops that act upon the gate to assist the gate closing mechanism.

---

Figure 1:
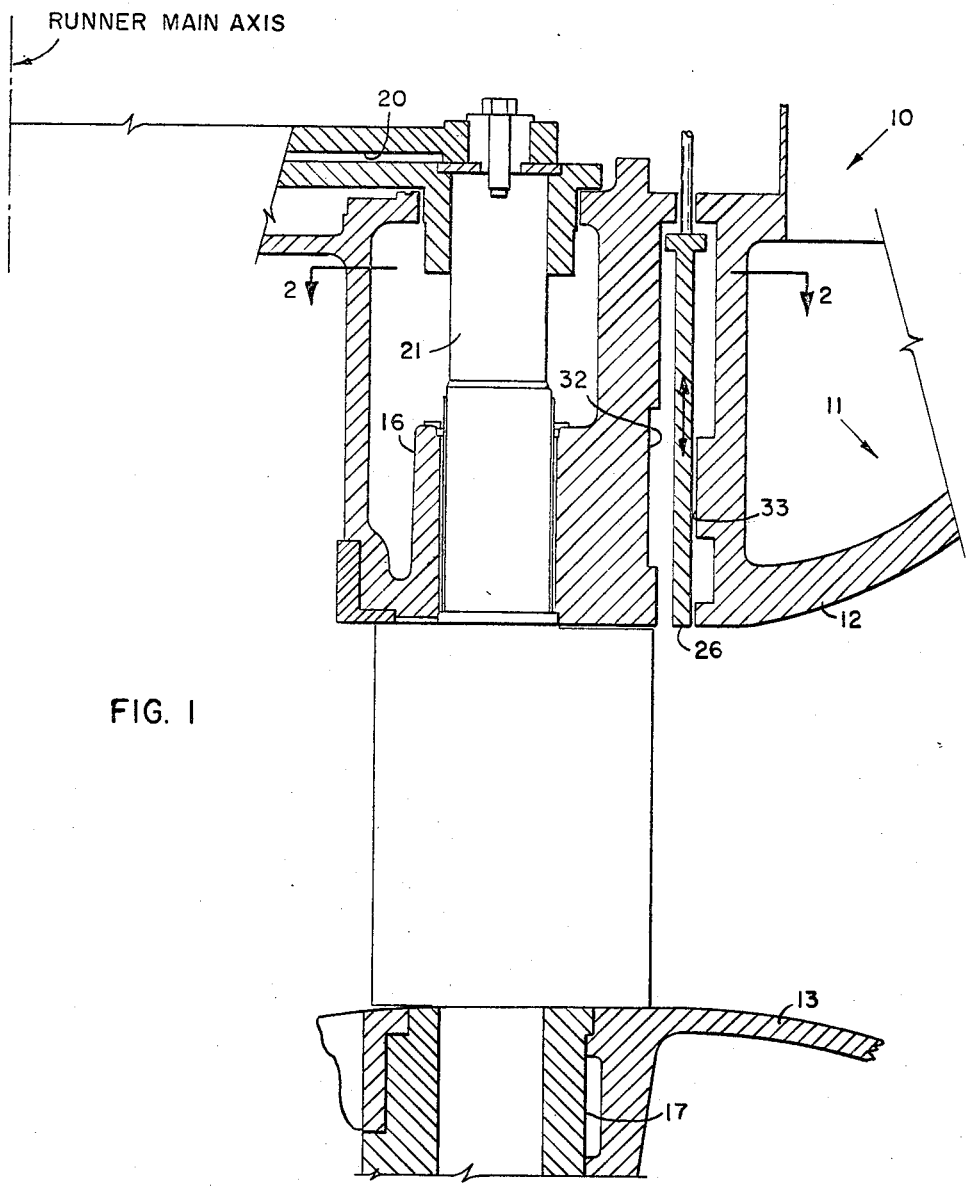

This invention is directed to an improved fluid flow control gate arrangement, and to a method of regulating the fluid forces acting longitudirally upon a flow control gate. In particular the invention is directed to an annular gate arrangement adapted for use with a hydraulic turbomachine such as a Francis turbine, or a pump or pump-turbine of similar form.

In turbo machines such as a Francis turbine certain operating advantages may be obtained by the utilization of an annular ring gate member generally located adjacent the adjustable guide vanes of the machine and moveable axially from a fully retractive position within the machine housing to a flow blocking position wherein flow of fluid through the machine is substantially completely prevented. Gates of this type generally function in the fully closed or fully open position and are not normally used to control the mass flow of working fluid through the turbo machine.

Some of the disadvantages experienced with this type of gate are: (1) the production of vibration in the gate structure in moving to the closed position during emergency closure; and (2) the high forces acting axially upon the gate owing to the action of the high energy stream of working fluid flowing thereby which produces large variations of stress in the operating mechanism actuating the gate, thus necessitating the provision of costly actuating structure.

An object of the present invention is to provide an improved annular gate arrangement wherein the axial forces acting upon the gate in response to fluid flow conditions are advantageously modified.

A further object of the present invention is to provide an annular gate structure requiring operating means of reduced capacity.

A further object of the present invention is to provide an improved gate structure having an improved operating characteristic.

The present invention provides an annular gate arrangement utilizing pressure differences to modify the operation of the gate, wherein the creation of pressure differential between the upstream and the downstream faces of the gate provides a by-pass flow of fluid through the gate chamber. This flow of by-pass fluid is controlled to promote local pressure differences therein, these pressure differences being arranged to act axially upon portions of the gate within the gate chamber to provide reduction in axial forces required of the gate actuating mechanism.

Thus there is provided a method of regulating the hydraulic forces acting longitudinally upon a flow interrupting member during longitudinal displacement of the member in transverse flow blocking relation relative to a high energy fluid stream, including the steps of by-passing a portion of the stream flow from the upstream to the downstream side of the member, directing the by-passed flow between a surface of the member and a cooperating adjacent surface in spaced relation therewith defining a flow path of varying cross-section, to produce a flow induced pressure drop in the by-passed fluid in accordance with the selected flow path and acting in a predetermined direction relative to the member, and applying the induced pressure drop to a top portion of the member to regulate the forces acting thereon.

Figure 2:
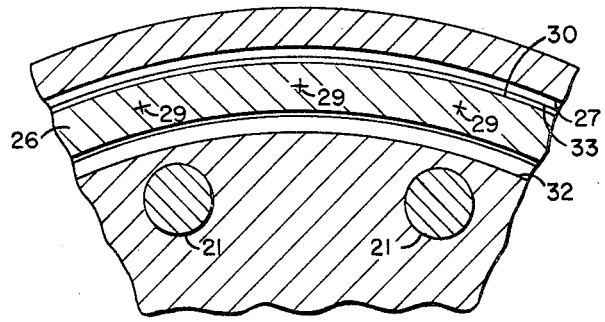
Figure 3A:
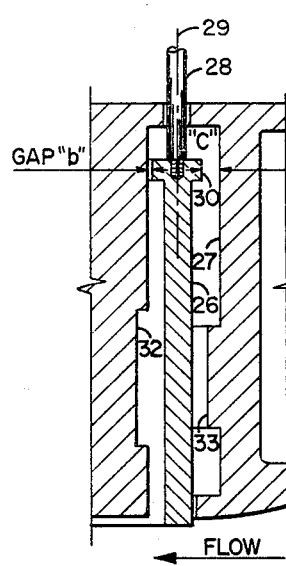
Figure 3B:
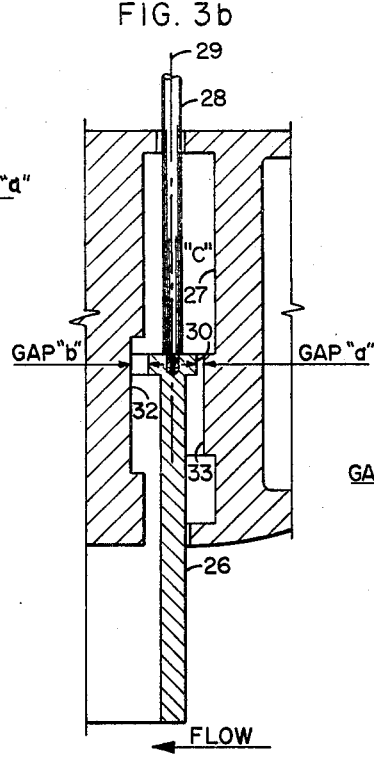
Figure 3C:
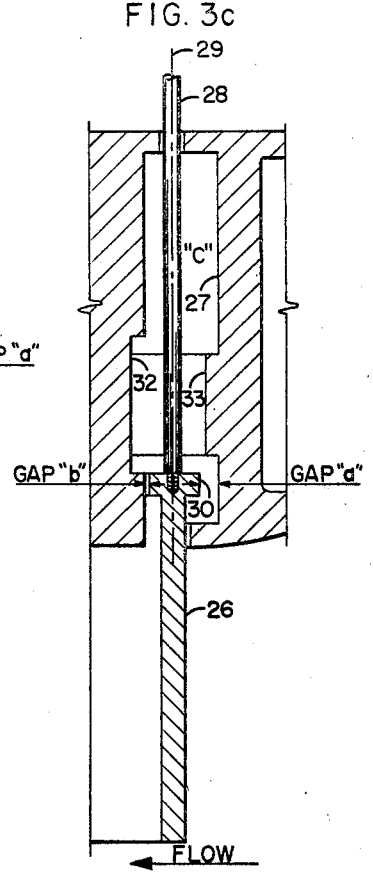

An embodiment of the present invention is described by way of example, reference being had to the accompanying drawings in which;

FIG. 1 is a sectional elevation through a portion of the housing of a Francis turbine, FIG. 2 is a part plan section at 2—2 of FIGURE 1; and FIGS. 3a, 3b and 3c are diagrammatic sectional views showing the gate in different positions.

Referring to FIGURES 1 and 2 the portion of turbine 10 includes part of a doughnut-shaped distributor ring 11 having upper and lower walls 12, 13, converging to an inlet throat 14.

An annular array of guide vanes 15 pivotally mounted opposite throat 14 in bearings 16, 17 located in the turbine housing upper and lower halves respectively are adjustably positioned by means of torque arms 20 keyed to the guide vane shafts 21, there being an annular array of guide vanes 15 arranged coaxially with the axis of the runner (not shown) and lying in coplanar annular arrangement within the throat 14 of the distributor 11.

The annular gate assembly 25 consists of the annular gate member 26 slidably mounted in an annular recess 27, having a plurality of actuator rods 28 in circumferential arrangement attached to the top of the gate member 26 at centres 29, for operation by a plurality of synchronized actuators (not shown).

The gate member 26 is provided with an upper annular ledge portion 30, while the gate recess 27 is illustrated having an annular indented portion 32, located on the "downstream" face of the gate recess 27, and an annular rib formation 33 extending from the upstream face of gate recess 27 in facing relation with the indent 32.

In defining the "upstream" and "downstream" faces of recess 27, it can be seen that in operation, when the lower edge 35 of the gate member 26 is moved downwardly to project into the incoming stream of working fluid that a pressure drop will be created across the thickness of the gate member 26, from the upstream to the downstream face thereof. This pressure drop causes a by-pass flow of the working fluid upwardly into the housing recess 27, over the top of the gate member 26, and downwardly and outwardly to exit past the guide vanes.

GATE OPERATION

Referring to FIGURES 3a, 3b and 3c, it will be seen that the flow of working fluid around the ledge or head portion 30 of the gate is controlled by the related widths of the annular passages or gaps in the upstream and downstream faces of the gate. Thus in FIG. 3a, the initial upstream face gap $a$ is large and the downstream face gap $b$ is small. When the gate 25 protrudes sufficiently into the main stream flow to produce an effective pressure drop between the upstream and the downstream faces of the gate, the pressure drop produced across gap $a$ is small, and that produced across gap $b$ is large. The net result is a gate closing force acting on the top face 50 of gate head 30, which tends to move the gate further into the mainstream, in assistance to the gate operating mechanism.

When the gate 25 reaches the position shown in FIG. 3b, the upstream face gap a is diminished, and the downstream face gap b is enlarged, causing and inversion in the related pressure drops, so that the pressure in space C above the head 30 is substantially reduced. This reduces the total closing force acting on the gate, and slows down the rate of gate closure.

As the gate 25 nears its closing position (FIG. 3c) the relative values of clearances a and b again change, a becoming large, b becoming small, to repressurize space C, and to re-exert additional closing force on the gate, so as to seat it firmly, and thus completely close-off the flow of working fluid past the gate.

Tests have shown that the axial force which must be exerted by the gate operating mechanism when closing the gate can be substantially reduced or even balanced by such an arrangement. It will be understood that the present arrangement can be modified to suit the flow characteristics of the flow distributor 11, so as to provide assistance in gate operation at a desired position or for a range of positions of the gate, by suitably varying the location of the respective upstream and downstream face clearances. By design changes in the value of the clearances, the forces acting on the gate can be controlled to desired values.

In addition to the improved gate operating characteristics afforded by the present invention, it will also be understood that economic advantages are provided by reduction in stress or in the size of the gate operating mechanism.

What we claim as new and desire to secure by Letters Patent of the United States is:

1. The method of regulating the movement of a flow interrupting member during longitudinal displacement of the member in flow controlling relation relative to a main fluid stream, comprising the steps of applying a first force to the member to produce longitudinal displacement of the member across said main stream in flow changing relation therewith, by-passing a portion of said main stream from upstream of said member to downstream thereof, including directing the flow of by-passed fluid over at least a surface portion of the member, between said surface portion of the member and a flow restricting cooperating spaced surface to obtain a flow induced drop in the pressure of said by-passed fluid, and applying said induced pressure drop to a projected end surface portion of the member to provide a second force acting longitudinally on said member whereby the effects of said first force acting thereon are modified and the motion of said member is regulated accordingly.

2. A gate arrangement for use in cooperation with an adjacent fluid conduit for controlling a high energy fluid flow therethrough, comprising: a gate housing connected in fluid flow connection with said conduit and extending angularly therefrom; gate means longitudinally moveable within said housing from a retracted position within said housing to a position extending therefrom in transverse flow controlling relation with said fluid flow in said conduit, said gate means having an upstream and a downstream face gate head means extending transversely of said housing in dynamic pressure sustaining relation with portions of said housing walls to define a fluid pressure chamber on the end of said gate remote from said conduit; mechanical gate operating means connected to said gate to move the gate relative to said housing; and flow control means carried by said gate for varying the flow of said high energy fluid in by-pass relation about said gate to control the fluid pressure within said pressure chamber, whereby the resultant longitudinal force acting on said gate may be controlled.

3. A gate arrangement as claimed in claim 2 wherein said by-pass flow control means comprises flow restriction means within said housing arranged in cooperating arrangement with said gate means to modify the pressure of said fluid in said chamber and provide pre-selected control of said longitudinal gate force.

4. A gate arrangement as claimed in claim 3 wherein said passage means include the portion of said gate means longitudinally moveable in cooperative by-pass flow controlling relation with adjacent wall portions of the interior of the housing forming said by-pass passage means, whereby variation in the effective pressure of the by-pass fluid operating longitudinally of said gate is controlled in accordance with the position of the gate means.

5. A gate arrangement as claimed in claim 4 wherein said gate means includes a gate having at least one change in effective cross-sectional area considered transversely of the direction of gate movement, to provide a pressure surface reactive to the pressure of said by-pass fluid, whereby reactive forces reacting longitudinally upon said gate are produced.

6. A gate arrangement as claimed in claim 5 wherein said gate means comprises an annular ring gate.

7. A gate arrangement as claimed in claim 2 wherein said gate means comprises an annular gate mounted in axially moveable relation with the fluid inlet to a turbo machine, having at least one annular shoulder portion in cooperative flow controlling relation with facing wall portions of said gate housing.

References Cited

UNITED STATES PATENTS

| | | | |
|---|---|---|---|
| 2,055,134 | 9/1936 | Pfau | 253—117 |
| 2,846,185 | 8/1958 | Widmer | 253—143 X |
| 1,821,054 | 9/1931 | Doughty et al. | 251—281 X |
| 2,986,367 | 5/1961 | Le Rouax | 251—281 X |

FOREIGN PATENTS

| | | |
|---|---|---|
| 305,214 | 1/1929 | Great Britain. |
| 783,798 | 10/1957 | Great Britain. |
| 1,108,435 | 8/1955 | France. |

EVERETTE A. POWELL, JR., Primary Examiner

U.S. Cl. X.R.

251—281